MAGNETIC DISC WITH AIR BEARING WHICH SPIRALS RADIALLY OUTWARD

Filed March 18, 1963 3 Sheets-Sheet 1

LESTER H. LEE
INVENTOR.

BY Robert G. Clay

ATTORNEY

LESTER H. LEE
INVENTOR.
BY Robert S. Clay
ATTORNEY

Feb. 7, 1967 L. H. LEE 3,303,485

MAGNETIC DISC WITH AIR BEARING WHICH SPIRALS RADIALLY OUTWARD

Filed March 18, 1963 3 Sheets-Sheet 3

LESTER H. LEE
INVENTOR.

BY Robert G. Clay
ATTORNEY 3,303,485

MAGNETIC DISC WITH AIR BEARING WHICH SPIRALS RADIALLY OUTWARD

Lester H. Lee, Mountain View, Calif., assignor to Ampex Corporation, Redwood City, Calif., a corporation of California Filed Mar. 18, 1963, Ser. No. 265,694
9 Claims. (Cl. 340—174.1)

The present invention generally relates to magnetic disk memory systems, and particularly relates to improvements in high speed flexible disk memory systems utilizing gas bearing phenomena.

As is well known, a high capacity, lightweight magnetic memory unit can be provided by mounting a thin, flexible magnetic disk for rotation in very closely spaced relation to a flat base plate. Magnetic recording and/or reproducing heads can be embedded flush with the base plate surface and at selected radial positions in the base plate, so as to be intransducing relationship with the adjacent magnetic surface of the disk. The disk is rotated at high speed so that it tends to lift away from the surface of the base plate and to maintain a relatively close spacing therewith. In this effect, the viscous forces of gas plays a part, with the disk tending to ride on a gaseous bearing surface comprising air spiraling outwardly from the axis of rotation of the disk. Air is drawn in from the atmosphere to the space betwen the disk and the base plate. Thus, air supply ports extending from the base plate surface are employed to achieve the disk-to-transducer head distance at various points along the radius of the disk. An attempt is made to maintain the disk-to-head distance relatively constant along the radius of the disk.

The described recording unit has the advantage of eliminating the need for heavy structural members which must be precisely machined. Instead, the unit is light weight and relatively simple to construct. The recording-reproducing heads can be embedded in the surface of the base plate and the base plate can be easily worked to make the surface of the heads flush with that of the base plate. Thus, precision initial alignment of the heads is not required. Moreover, the high speed at which the disk may be spun contributes to high frequency, high density recording and a relatively high volumetric efficiency for the unit.

However, there are certain disadvantages with such a unit. In this regard, the relatively thin, flexible recording disk, although held somewhat straight by gas bearing action at high speeds of rotation still has a tendency to waffle or bend. Accordingly, careful spacing of the described strategically placed air supply ports is necessary in order to establish and maintain the described disk-to-transducer head spacing along the radius of the disk. Such careful spacing adds to the cost and present difficulties in locating the magnetic heads. Moreover, it has been found to be impractical to attempt to properly space the periphery of the rotating disk from a transducer head in the base plate. Thus, the periphery of a disk fabricated of the usual thin flexible magnetic recording medium such as that which is sold commercially as Mylar, a trademark of E. I. du Pont de Nemours & Co., Inc., chemically known as polyethylene terephthalate film, has a pronounced tendency to curl or bend. Conventional flexible rotating disk memory units do not utilize a substantial proportion of the margin or periphery of the disk for recording or reproducing purposes and, accordingly, there is a considerable waste of disk surface and a decrease in volumetric efficiency over that theoretically possible.

Accordingly, it is the primary object of the present invention to provide an improved flexible disk memory system.

It is a further object of the present invention to provide a high and low speed flexible disk memory system which employs improved disk-to-transducer head spacing means.

It is also an object of the present invention to provide a high speed, flexible disk memory system which has improved disk stability and recording capability.

It is a still further object of the present invention to provide a high speed flexible disk memory system which has improved volumetric efficiency in that it utilizes larger areas of the disk for recording and reproducing.

It is another object of the present invention to provide a ralatively simple and inexpensive high speed, flexible disk memory system that provides a more consistent disk-to-transducer head spacing, which may be easily made a function of the disk radius, if desired.

These and other objects are accomplished, in accordance with the present invention, by rotating a thin, pliant, flexible recording-reproducing disk between two backing plates carrying embedded transducer heads.

A multiplicity of ports coupled to the atmosphere, or to air pressure sources for low speed operation are disposed centrally on each side of the disk to feed air radially outwardly, maintaining differential balancing forces which stabilize the disk and control the disk-to-transducer head spacings without the need for additional air ports along the radius. Such disk-to-head spacings are kept uniform throughout the entire disk and at various speeds of rotation, so that the entire surface of the disk, including the outer periphery of the disk, is available for recording and reproducing. Moreover, not just one but both sides of the disk can be used for signal recording and reproduction. Accordingly, the volumetric efficiency of the system is substantially increased.

A better understanding of the present invention may be had by reference to the following detailed description, taken in conjunction with the accompanying drawings, of which:

Figures 1, 2:
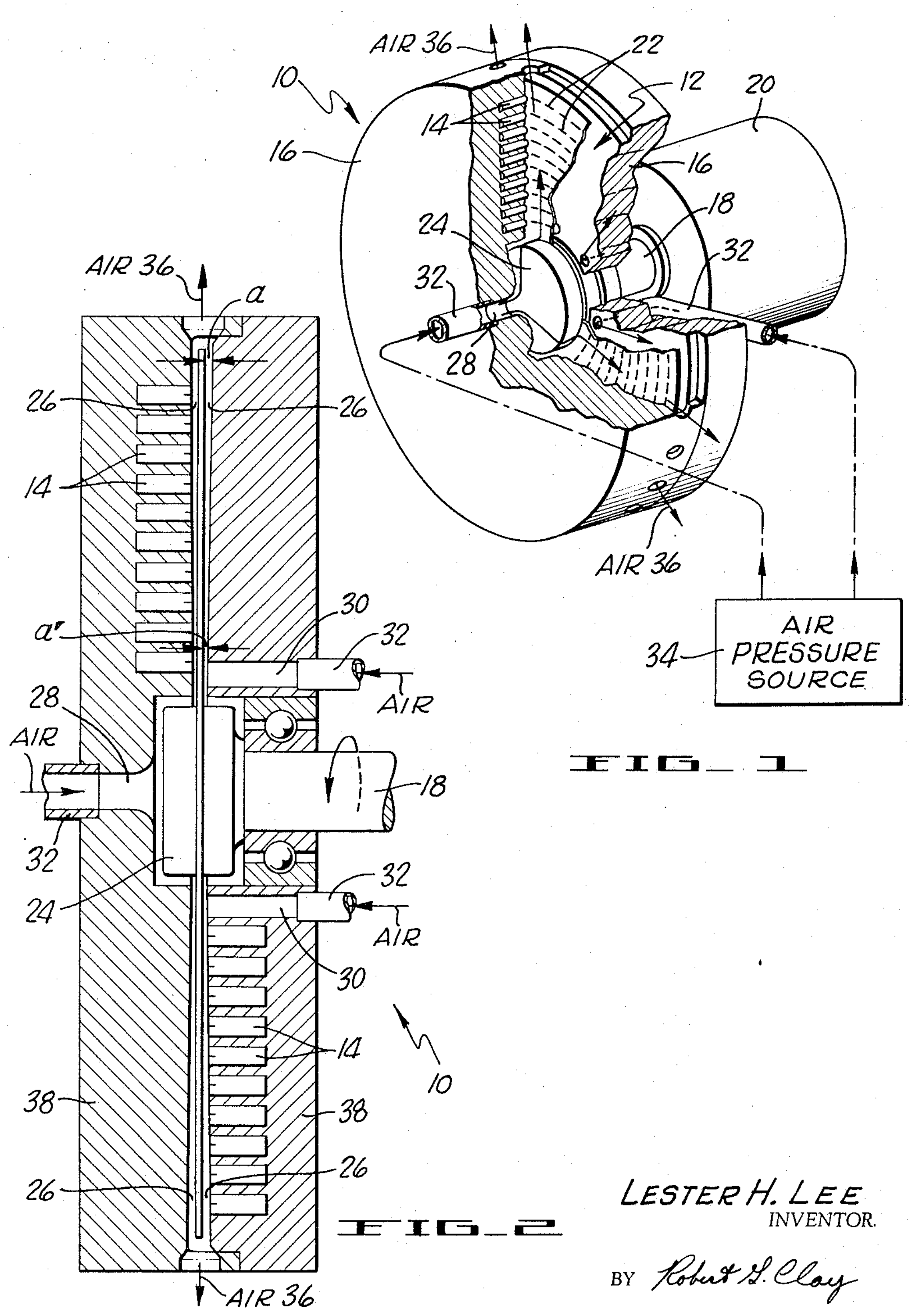
FIGURE 1 is a perspective view, partially proken away, of the principal elements of a recording and reproducing system in accordance with the present invention.
FIGURE 2 is an enlarged side section of the major portion of the embodiment of FIGURE 1, illustrating further details thereof.

Referring now to FIGURES 1 and 2, an illustrative magnetic data recording and reproducing system 10 in accordance with the invention is shown. The system is fabricated of materials conventional to such recording and reproducing systems and includes rotating elements, generally designated by the numeral 12, and fixed magnetic transducer heads 14 mounted within an outer housing 16. The principal operative elements of the system 10 are mounted substantially symmetrically around a central shaft 18 which is driven at a selected speed (e.g. 0–100,000 r.p.m.) by a motor 20 which is secured to the housing 16. The recording medium in the system 10 comprises a relatively thin, flexible disk 22 mounted on a hub 24 secured to the central shaft 18. The plane of the disk 22 is perpendicular to the central axis of the shaft 18 in normal operation of the system 10. The disk 22 is preferably a relatively thin sheet of plastic, which has been treated to have magnetic surfaces on both sides thereof. The magnetic surfaces disposed on the base may include magnetic iron oxide particles or the like. The disk 22 is sufficiently thick so as to provide adequate magnetic shielding between the two sides of the disk and is sufficiently thin so that the disk 22 is flexible. For most purposes it has been found that a disk thickness of about 2–5 mils is adequate. However, disks of other suitable thicknesses can also be utilized.

The housing 16, as shown in FIGURE 1, includes pneumatic orifices symmetrically disposed relative to the axis of the central shaft 18. These orifices extend into contact with a central space 26 in the housing 16 within which disk 22 is disposed. As shown in FIGURE 2, when shaft 18 is cantilever mounted, a single orifice 28 along the central shaft axis is sufficient on one side of the disk 22, but on the opposite side of disk 22 a plurality of symmetrically disposed orifices 30 adjacent to the disk hub 24 may be employed. The orifices 28 and 30 are coupled through suitable conduit means 32 to one or a plurality of sources 34 of gas (usually, but not necessarily air) under pressure or at ambient atmosphere, as shown in FIGURE 1.

Radially outwardly from the outer circumference of the disk 22 there are provided a plurality of outlet pressure orifices 36 disposed at a plurality of points along the outer periphery of the housing 16. If the operation of the device requires pressurized gas, such as for extremely low speed operation, the pressure source can comprise a blower or the like (not shown) which provides a high gas volume, but not necessarily a high gas pressure, so as to supply a suitably high gas flow to the space 26, as more particularly described hereinafter. However, other suitable pressure means can be utilized. For closed environments, a recirculating system which returns the gaseous medium, such as air, with or without filtering, to the gas inlet orifices 28 and 30 can be advantageously employed.

The thin recording-reproducing disk 22 extends, in its operative position, between and is spaced from, as by space 26, a pair of backing plates 38 having smooth substantially parallel facing surfaces. These backing plates may be as shown in FIGURES 1 and 2, integral with the housing 16. Alternatively, they may be separate members, preferably disposed within a housing. In the latter event, the gas inlet orifices should extend not only through the housing but also through the backing plates so as to be in communication with space 26. The disk 22 is spaced from the backing plates 38 a desired small distance. A flow of gas in space 26 is used to provide a gas bearing or air cushion so as to maintain the desired separation of the disk 22 from the backing plates 38 on each side thereof during normal operation of the system 10. The manner in which this is accomplished is more particularly described hereinafter.

Each backing plate 38 includes a number of magnetic transducer heads 14 embedded therein and substantially flush with the surface of each backing plate 38 facing the adjacent recording surface on the disk 22. It will be appreciated that for most suitable frequency response and magnetic coupling, the magnetic heads 14 should be spaced only a relatively short distance from the recording surfaces of the disk 22. However, since the rate of travel of the recording surface increases radially and, consequently, for a given head-to-recording surface spacing the amplitude of the signal response would increase radially, provision may be made to equalize the amplitude of the signal response. In order to accomplish this, the head-to-recording surface spacing can be adjusted to increase radially merely by disposing the backing plates 36 at slightly radially diverging angles relative to the plane of the disk 22. Thus, as is shown in FIGURE 2, the spacing between the recording surface of the disk 22 and the associated backing plate surface 36 (and thus transducer heads 14), at a point designated *a* is greater than such spacing at a point designated *a'* which is closer to the axis of the disk 22. It should specifically be noted that the drawings are illustrative and schematic in this respect, that is, not to scale. Thus, the spacings between the disk 22 and the adjacent backing plates 36 and the thickness of the disk 22 itself have been greatly exaggerated to facilitate representation of this arrangement and an understanding thereof. By shaping the surfaces of the backing plate the spacing 26 may be made any desired quantity along the radius of the disk 22.

During operation of the system 10, the disk 22 is rotated at a high rate of sped, for example, 50,000 r.p.m. and the magnetic heads cooperate therewith to record magnetic patterns on, or reproduce signals from record tracks on the disk 22. The disk 22 would normally tend to deviate from a strictly planar relationship at high speeds, because there is a tendency for the flexible medium to shift towards the outer periphery as a result of centrifugal action. Conventional devices, using a single backing plate, seek to overcome these standing wave patterns through the use of a plurality of pneumatic orifices or air jets, as previously described, which are radially spaced at laboriously selected points relative to the disk, and which have to be carefully adjusted to maintain a desired spacing between the backing plate and recording surface. Such adjustments, however, cannot practically overcome the tendency of the recording disk to curl at the outer periphery thereof, in which region best signal response should be obtainable. However, in accordance with the present invention, a differential gas-bearing effect is achieved whereby these difficulties of adjustment and uniformity are obviated. Thus, in system 10, once the gas flow to each side of disk 22 is suitably adjusted, depending upon the number, size and positions of the inlet orifices 28 and 30, equal gas lubricating forces are directed to opposite sides of the central disk 22. These forces act substantially uniformly on both disk surfaces throughout the entire area of the disk 22 and, without further adjustment or limitation, maintain the disk throughout the entire area thereof suitably spaced from the transducer heads 14 for maximum recording and reproducing efficiency. The whole extent of both sides of the disk, including the periphery thereof, is available for high quality recording and reproduction. This effectively more than doubles the volumetric efficiency of the recording and reproducing system 10, in contrast to conventional systems.

Figure 3:
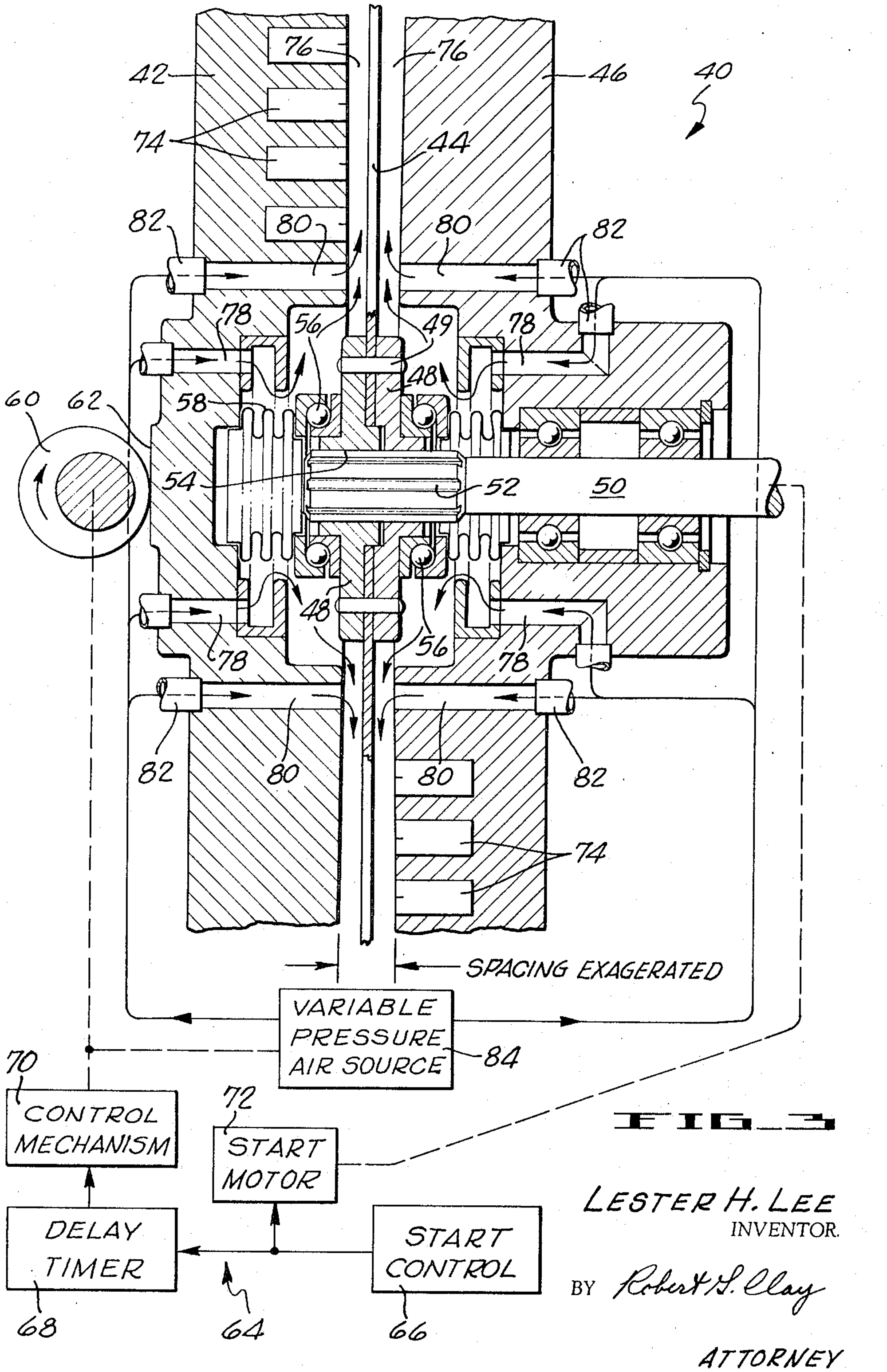
FIGURE 3 is a side section of a second embodiment in accordance with the present invention, illustrating axially adjustable members.

The embodiment illustrated in FIGURE 3 includes components similar to those described and illustrated in FIGURES 1 and 2, but further includes a number of additional features having particular and specific advantages. In the high speed flexible magnetic disk recording reproducing system 40, illustrated in FIGURE 3, the backing plates are not fixedly mounted, relative to each other, but, instead, backing plate 42 and the central recording and reproducing disk 44, which is similar to disk 22, are axially movable relative to the fixed backing plate 46. As previously described in connection with the embodiment of FIGURES 1 and 2, the central disk 44 is mounted on a central hub 48, as by pins 49, which hub is concentric with the central axis of a shaft 50. The hub 48 is axially movable along a splined portion 52 of the shaft 50, being held thereon by an appropriate internally geared portion 54. A pair of low-friction roller bearings 56 are mounted on each of the opposite sides of the hub and are mechanically coupled to the adjacent backing plates by bellows-type compression springs 58. The springs 58 tend to urge the central disk into an intermediate position relative to the two backing plates regardless of the extent of axial separation of the backing plates 42 and 46.

When system 40 is started up, the movable backing plate 42 is more widely separated from the fixed backing plate 46 than during operation of the system 40 at normal disk rotating speeds. A rotary cam 60 is provided which, during operation of system 40, acts on a cammed surface 62 disposed on backing plate 42 and tends to urge plate 42 towards fixed backing plate 46, particularly as normal disk operating speeds are reached. In this regard, a cycle control 64, comprising a start control 66, a delay timer 68 and a control mechanism 70, such as a rotary solenoid or the like, all of which may be of conventional design, are coupled in any suitable conventional manner to the rotatable cam 60. A motor 72 is connected to the start control 66. When the motor 72 is actuated by the start control 66, the delay timer 68 is concurrently actuated and, after a predetermined delay, the control mechanism 70 is actuated to rotate the cam and bring the backing plates closer together.

Several additional features are also provided in this arrangement. In this regard, the radial positions of the transducer heads 74 on the opposite sides of the central disk are staggered so as to reduce the possibility of "cross-talk" such as might occur between oppositely disposed tracks. Moreover, the gas supply to space 76 between the disk 44 and plates 42 and 46 is arranged so that it can be controlled simultaneously with and as a result of movement of disk 44 and plate 42. Accordingly, there is a considerable control over the gas bearing provided for the disk 44. In this regard, backing plates 42 and 46 include a plurality of gas inlet orifices symmetrically disposed in and around the axis of rotation of disk 44. These orifices provide access to the space 76 between the disk 44 and the associated backing plates and are of two types. As shown in FIGURE 3, one type of inlet orifices, that is, orifices 78, are orientated in each backing plate so that they pass gas to space 76 in a direction parallel with the plane of the disk 44. The other type of inlet orifices, that is, orifices 80, pass gas to space 76 in a direction perpendicular to the plane of the disk 44. Alternatively, of course, gas inlet orifices may be disposed at different positions adjacent the central axis then those illustrated in FIGURE 3. Orifices 78 and 80 are connected to gas conduits 82 which are in turn connected to a variable pressure pneumatic source 84, which may be substantially similar to source 34 described in connection with the embodiment of FIGURE 1. The source 84 is electrically interconnected with central mechanism 70, as shown in FIGURE 3.

The particular arrangement of orifices, conduits and pneumatic pressure source cooperates to provide a high gas volume per unit time during start-up of system 40, and thereafter to provide a lower gas volume per unit time during steady-state operation of system 40. For this purpose, during the start-up of system 40, the rotary cam 60 is turned so that the springs 58 urge the movable backing plate 42 and the disk 44 to their starting positions, i.e., away from fixed plate 46, as shown in FIGURE 3. During such movement, the disk hub 48 slides along the splined portion 52 of shaft 50. In actuating the cam, the start control 66 is actuated which, in turn, starts motor 72 and sets delay timer 68 in action and operates control mechanism 70. Mechanism 70 effects turning of the cam.

During start-up of system 40, the variable pressure air source 84 is actuated by mechanism 64 and is operated in a starting state, i.e., to provide a high gas pressure to inlet orifices 78 and 80, all of which have a clear path to space 76, with the disk 44 and plates 42 and 46 being in the position illustrated in FIGURE 3. Accordingly, the flexible disk 44 encounters a differential gas (such as air) bearing which provides a relatively high sheer force during the start-up interval, that is, when inertial forces are highest and centrifugal forces are lowest. The high air or other gas flow rate acting equally upon both sides of the disk 44 tends to straighten out the flexible disk and to keep it separated at all times a suitable distance from the faces of the backing plates 42 and 46.

When normal operating speed of the disk 44 in system 40 has been obtained, the gas pressure is lowered. Thus, after the delay determined by the delay timer 68, the control mechanism 70 actuates both the variable air pressure source 84 and the rotatable cam 60, simultaneously reducing the pressure and causing the disk 44 and backing plate 42 to move into closer proximity to plate 46. However, the disk 44 automatically remains centered between plates 42 and 46 as the movable backing plate 42 is axially advanced towards the fixed backing plate 46.

Concurrently, orifices 78 are effectively closed off or blocked by the intervening roller bearing 56. However, it will be appreciated that other mechanisms can be employed, as well, to selectively block off orifices 78; for example, a flange (not shown) on the disk hub 48. Orifices 80 are still left open to allow a lower but steady gas flow to space 76 and to provide the desired gas bearing effect.

Figure 4:
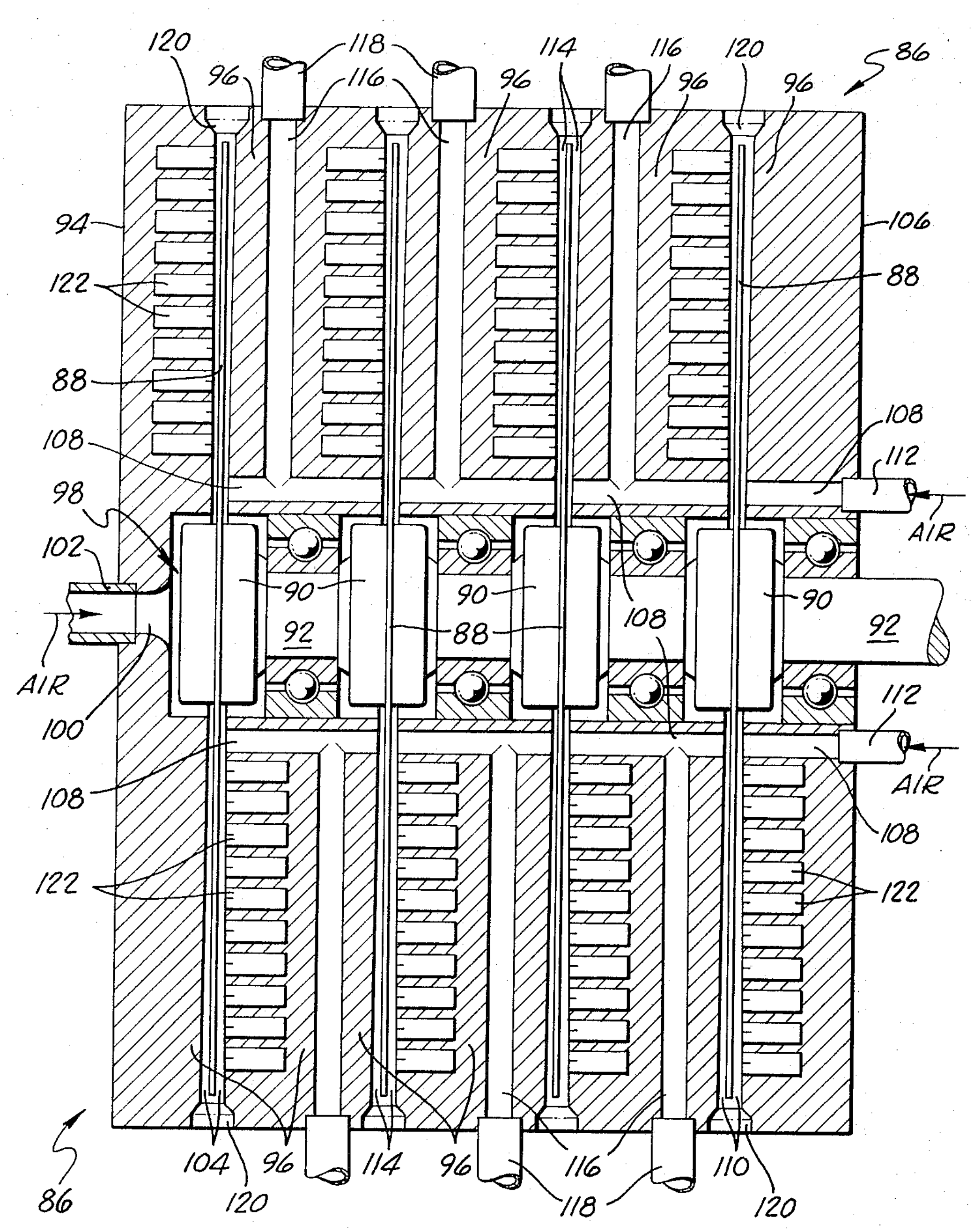
FIGURE 4 is a side section of a third embodiment in accordance with the present invention, illustrating a plurality of disks.

Yet another embodiment of the high speed, flexible disk memory system in accordance with the invention is illustrated in FIGURE 4. System 86 of FIGURE 4 includes a plurality of reproducing-recording disks 88 substantially similar to disks 22 and 44 and, accordingly, expands the total recording-reproducing capability of the system. System 86 has the same high volumetric efficiency per disk as systems 10 and 40 previously described.

Referring to FIGURE 4, thin flexible disks 88 are illustrated as separately mounted in spaced relation on hubs 90 secured to a common central rotatable shaft 92 driven by a motor or other means (not shown). All of the disks 88 are disposed within a common housing 94, but the disks 88 are disposed in each instance between a pair of separate backing plates 96 with the successive disks 88 and sets of backing plates 96 arranged in a series fashion, as shown in FIGURE 4.

Adjacent the free end 98 of the central shaft 92, a central orifice 100 may be positioned in the end backing plate 96 forming a part of housing 94. Orifice 100 is connected to a suitable gas inlet conduit 102, in turn connected to a pressure gas source (not shown), and is adapted to direct air or gas against one side of the end disk 88 in space 104. Similarly, at the opposite end 106 of the housing, orifices 108 may be extending through the backing plate forming a part of the housing into the space 110 communicating with the disk 88 disposed therein. Suitable gas inlet conduits 112 are coupled to orifices 108 and to the described gas pressure source (not shown). Between these two terminal portions of the housing, lubricating gas (air or the like) for the differential gas bearing effect is introduced into the spaces 114, containing the respective disks 88, by separate orifices 116 extending down between the oppositely facing backing plates and terminating on each side of the disks 88 adjacent the axis of rotation thereof. Orifices 116 are coupled to gas inlet conduits 118 leading from the gas pressure source (not shown).

Gas such as air is therefore supplied from a gas pressure source through pneumatic coupling lines or conduits to and through the various inlet orifices to both sides of each of the disks 88. The inlet orifices are thus arranged similarly to those of the embodiment of FIGURES 1 and 2, and provide a similar differential gas bearing effect on the disks 88. The exhaust gas flows out of the spaces within which the disks 88 are disposed through apertures 120 located in the housing at the outer periphery of the disks 88, as shown in FIGURE 4.

Although the housing 94 and the backing plate members 96 are illustrated as being of solid material, they may, of course, be constructed of webbed or other open-type members to simultaneously provide adequate structural strength and light weight. They include shaped channel portions (not shown) for receiving the terminals (not shown) of the system windings from the various transducers 122.

FIGURE 4 illustrates that the present invention has an important advantage over conventional high speed flexible disk memory systems. In this regard, the system of the present invention eliminates the need for special air balancing and adjustment means for the recording-reproducing disks. This, in turn, permits a great many such disks to be mounted on a common shaft, and to be spaced very closely together thereon for maximum utility of the system. Substantially all of both sides of each disk, including the periphery thereof, is available for recording and reproducing. The disk-to-head spacings are readily controlled and stabilized for maximum efficiency in recording and reproducing.

While there have been described above and illustrated in the drawings various forms of high speed flexible disk magnetic memory systems in accordance with the present invention, it will be appreciated that the invention may take a number of other forms and arrangements.

What is claimed is:

1. A flexible disk magnetic memory system comprising:

a relatively thin flexible disk having magnetic recording surfaces on both sides thereof;

a pair of backing plates, each of said plates being aligned adjacent a different side of said disk and providing a planar surface in controlled parallelism therewith;

a plurality of magnetic transducer disposed in each plate;

means for rotating said disk relative to said plates about the central axis of said disk; and spacing means for maintaining said plates and disk in controlled spaced relation, said spacing means including means adapted to direct a substantially equal flow of gas to the space between said plate and said disk on each side of said disk between the central axis of said disk and the innermost of said transducers so as to provide a gas bearing which spirals radially outwardly from said central axis during rotation of said disk.

2. A flexible disk magnetic memory system comprising:

a relatively thin flexible disk having magnetic recording surfaces on both sides thereof;

a pair of backing plates, each of said plates being aligned adjacent a different side of said disk and providing a planar surface in controlled parallelism therewith;

a plurality of magnetic transducers spaced radially outwardly in each plate to a point corresponding to about the periphery of said disk, said transducers being disposed at the surface of said each plate which is adjacent said disk;

means for rotating said disk about the central axis thereof; and spacing means for maintaining said plates and disk in controlled spaced relation, said spacing means including pneumatic pressure means and conduit means connected thereto extending through said plates and adapted to direct a substantially equal flow of gas to each space between said plate and said disk on each side of said disk between the central axis of said disk and the innermost of said transducers so as to provide a gas bearing which spirals radially outwardly from said central axis during rotation of said disk and maintains said disk substantially in one plane throughout substantially the entire diameter thereof.

3. A flexible disk magnetic memory system comprising:

a relatively thin flexible disk having magnetic recording surfaces on both sides thereof;

a pair of backing plates, each of said plates being aligned adjacent a different side of said disk to present a planar surface thereto which surface diverges radially therefrom a sufficient extent to compensate for a normal increase in signal amplitude with radially increasing speed of travel of said disk during rotation thereof;

a plurality of magnetic transducers disposed in each plate at about the surface thereof which is adjacent said disk;

means for rotating said disk about the central axis thereof; and spacing means for maintaining said transducers and disk in controlled spaced relation, said spacing means including means extending through said plates and adapted to direct a substantially equal flow of gas to each space between said plate and said disk on each side of said disk between the central axis of said disk and the innermost of said transducers so as to provide a gas bearing which spirals radially outwardly from said central axis during rotation of said disk and maintains said disk substantially in a single fixed plane through substantially the entire diameter thereof.

4. A flexible disk magnetic memory system comprising:

a relatively thin flexible disk having magnetic recording surfaces on both sides thereof;

a housing defining a central space within which is disposed said disk in spaced relation thereto;

said housing including a pair of backing plates, each of said plates being aligned adjacent to a different side of said disk to present a planar surface thereto, said surface having controlled parallelism therewith;

a plurality of magnetic transducer heads disposed in each plate the surface thereof which is adjacent to said disk, said heads being spaced radially outwardly to about a point corresponding to the periphery of said disk, said heads in one of said plates being disposed in staggered relation with respect to the heads of the other of said plates;

means for rotating said disk about the central axis thereof, and spacing means for maintaining said heads and disk in controlled spaced relation, said spacing means including pneumatic pressure means; and conduit means connected thereto and orifice means extending through the backing plates of said housing into said central space and adapted to direct a substantially equal flow of gas to the area between said plate and said disk on each side of said disk between the central axis of said disk and the innermost of said transducers in said space so as to provide a gas bearing which spirals radially outwardly from said central axis during rotation of said disk and maintains said disk substantially in one plane throughout substantially the entire diameter thereof.

5. A flexible disk magnetic memory system comprising:

a rotatable central shaft;

a plurality of relatively thin flexible disks having magnetic recording surfaces on both sides thereof mounted in axially spaced relation on said shaft, a plurality of backing plates disposed in generally parallel series relation with said disks, whereby each disk is separated from every other disk by at least one of said plates and whereby a plate is disposed adjacent each side of each disk and presents a planar surface thereto;

a plurality of magnetic transducers disposed at about the surface of each of said plates which is adjacent to said disk; and spacing means for maintaining said plates and disks in controlled spaced relation, said spacing means including means adapted to direct a substantially equal gas flow to the space between said plates and said disks on each side of each of said disks and between the central axis of each disk and the innermost of said transrucers so as to provide gas bearings which spiral radially outwardly from said axis during rotation of said disks.

6. A flexible disk magnetic memory system comprising:

a rotatable central shaft;

a plurality of relatively thin flexible disks having magnetic recording surfaces on both sides thereof mounted in axially spaced relation on said shaft;

a housing defining a space between which said disks are disposed;

a plurality of backing plates disposed in generally parallel series relation with said disks in said housing, each of said plates being aligned adjacent to a different side of each of said disks and presenting a planar surface thereto, said disks being separated from one another by said plates;

a plurality of magnetic transducers disposed in each of said plates at about the surface thereof facing a side of one of said disks, said transducers being distributed radially outwardly to about a point opposite the periphery of said disks; and spacing means for maintaining said plates and disk in controlled spaced relation, said spacing means including pneumatic pressure means and conduit and orifice means adapted to direct a substantially equal flow of gas to the space between each of said plates and said disks on each side of each of said disks between the central axis of each disk and the innermost of said transducers so as to provide gas bearings which spiral radially outwardly from said central axis during rotation of said disks and maintain said disks in parallel relation to each other and in substantially stabilized position with respect to said plates.

7. A flexible disk magnetic memory system comprising:

a relatively thin flexible disk having magnetic recording surfaces on both sides thereof;

a pair of backing plates, each of said plates being aligned adjacent to a different side of said disk and presenting a planar surface in controlled parallelism therewith;

a plurality of magnetic transducers disposed in each plate at about the surface which is adjacent to said disk;

means for rotating said disk relative to said plates about the central axis of said disk; and spacing means for maintaining said plates and disk in controlled spaced relation, said spacing means including means for axially selectively positioning said plates relative to said disk and means adapted to direct a substantially equal flow of gas to the space between said plate and said disk on each side of said disk between the central axis of said disk and the innermost of said transducers so as to provide a gas bearing which spirals radially outwardly from said central axis during rotation of said disk and maintains said disk in substantially one plane throughout substantially the diameter thereof.

8. A flexible disk magnetic memory system comprising:

a relatively thin flexible disk having magnetic recording surfaces on both sides thereof;

a pair of backing plates, each of said plates being aligned adjacent to a different side of said disk and presenting a planar surface in controlled parallelism therewith;

a plurality of magnetic transducers disposed in each plate adjacent the surface next to said disk;

means adapted to rotate said disk about the central axis thereof; and spacing means adapted to maintain said plates and disk in controlled spaced relation, said spacing means including means for axially repositioning said disk and one of said plates with respect to the other of said plates;

including spring means for maintaining said disk centered between said plates during said repositioning; and conduit means adapted to direct substantially equal flow of gas to the space between said plate and said disk on each side of said disk adjacent to the central axis thereof so as to provide a gas bearing which spirals radially outwardly from said central axis during rotation of said disk;

said conduit means including aperture means adapted to be closed when said plates most closely approximate each other whereby said gas flow to said space is reduced.

9. A flexible disk magnetic memory system comprising:

a relatively thin flexible disk having magnetic recording surfaces on both sides thereof;

a pair of backing plates, each of said plates being aligned adjacent to a different side of said disk and presenting a planar surface in controlled parallelism therewith;

a plurality of magnetic transducer heads disposed in each plate at said surface thereof adjacent to said disk, said heads being distributed in said plate out to about a point opposite the periphery of said disk;

means for rotating said disk about the central axis thereof; and spacing means for maintaining said plates and disk in controlled spaced relation, said spacing means including pneumatic pressure means;

means for axially repositioning said disk and one of said plates between a position close to the other of said plates and a position relatively remote from the other of said plates;

including spring means for maintaining said disk centered between said plates during said repositioning;

conduit means adapted to direct a substantially equal flow of gas to the space between said plate and said disk on each side of said disk adjacent the central axis thereof so as to provide a gas bearing which spirals radially outwardly from said central axis during rotation of said disk;

said conduit means including aperture means adapted to be closed when said plates are repositioned to said position close to each other, whereby said gas flow to said space is reduced; and means for reducing gas flow from said pneumatic pressure means simultaneously with said closing of said apertures.

References Cited by the Examiner

UNITED STATES PATENTS

| | | | |
|---|---|---|---|
| 3,108,259 | 10/1963 | Perkins et al. | 340—174.1 |
| 3,131,395 | 4/1964 | Lekas | 340—174.1 |
| 3,226,701 | 12/1965 | Masson | 340—174.1 |

FOREIGN PATENTS

| | | |
|---|---|---|
| 1,125,195 | 3/1962 | Germany. |

OTHER REFERENCES

Khoury, "Disc Air Bearing," IBM Technical Disclosure Bulletin, October 1961, vol. 4, No. 5.

BERNARD KONICK, *Primary Examiner.*

A. BERNARD, V. P. CANNEY, *Assistant Examiners.*